Dec. 15, 1959 J. W. HAAS 2,917,687

WOUND CAPACITOR

Filed Feb. 14, 1956

John W. Haas
INVENTOR.

BY Daniel I. Mayne,
Paul R. Holmes
ATTORNEYS

United States Patent Office 2,917,687

Patented Dec. 15, 1959

2,917,687

WOUND CAPACITOR

John W. Haas, Rochester, N.Y., assignor to Eastman Kodak Company, Rochester, N.Y., a corporation of New Jersey Application February 14, 1956, Serial No. 565,366

1 Claim. (Cl. 317—260)

This invention relates to a capacitor and more particularly to a solid wound capacitor.

The capacitor industry for a number of years has attempted to produce an inexpensive and serviceable solid wound capacitor. Two problems encountered in the construction of a good uninsulated, unimpregnated wound capacitor are, first, that the capacitor is soft, easily deformed and susceptible of retaining moisture because of the hollow center void which results from the winding of the capacitor on a removable arbor and, second, that the capacitor leads extend from the ends of the capacitor eccentric to the longitudinal axis of the capacitor. The wound capacitor constructed in accordance with the present invention eliminates these undesirable features and forms a rugged, inexpensive unit. The capacitor comprises a cylindrical core having an axial throughbore for receiving the capacitor leads. The core is formed with two semi-cylindrical sections bound together by the alternate convolutions of dielectric and metal sheets which are wound around the core and which form the capacitor electrodes. Portions of the electrodes pass between the core sections and extend into the throughbore in contact with the capacitor leads.

The primary object of the present invention, is therefore, to provide a capacitor comprising a solid core for supporting the alternate layers of dielectric and metal sheets forming the spaced capacitor electrodes.

Another object of the present invention is to provide a solid wound capacitor in which alternate layers of dielectric and metal sheets forming the spaced capacitor electrodes are passed between the two sections of a longitudinally split cylindrical core and are wound around the core to bind the core sections together as a unit.

Still another object of the present invention is to provide a solid wound capacitor comprising a longitudinally split cylindrical core around which the alternate layers of dielectric and metal sheets are wound to form the spaced capacitor electrodes, and having an axial throughbore for receiving and retaining the capacitor leads in contact with portions of the proper metal electrode.

Yet another object of the present invention is to provide a solid wound capacitor comprising a cylindrical plastic core having an axial throughbore for receiving the capacitor leads and formed with two semi-cylindrical sections bound together by the alternate convolutions of dielectric and metal sheets which are wound around the core and form the capacitor electrodes, portions of which pass between the sections and extend into the throughbore in contact with the proper capacitor lead.

Still other objects and advantages of the present invention will become readily apparent to those skilled in the art from the following description with reference to the drawing in which like characters denote like parts and wherein.

Figure 1:
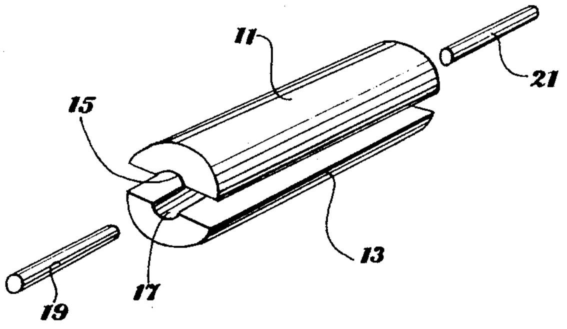
Fig. 1 is an exploded view showing the shape of the core for the capacitor of my invention.
Figure 3:
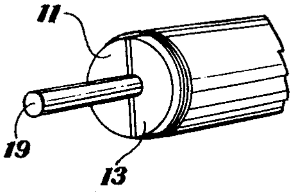
Fig. 3 is a perspective view illustrating the solid wound capacitor of my invention.
Figure 2:
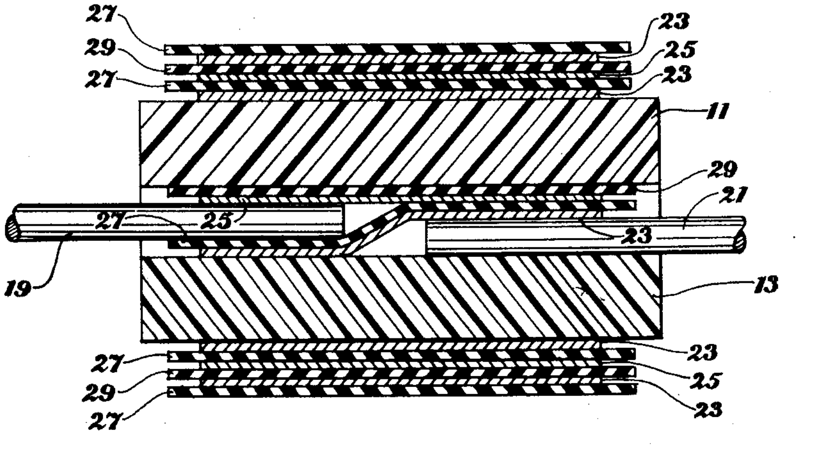
Fig. 2 is a cross-sectional view of the capacitor.

The solid wound capacitor of my invention as illustrated in the drawing, comprises two semi-cylindrical half cores 11 and 13 placed in juxtaposition to form a cylindrical core. Half cores 11 and 13 are formed of a dielectric material such as for example a suitable thermoplastic, and are provided with recesses 15 and 17 respectively, along the longitudinal axes thereof. The recesses 15 and 17 have preferably a semi-circular cross section and form an axial throughbore in the cylindrical core for receiving and retaining the capacitor leads 19 and 21 as will be hereinafter described. Two sheets of metal foil 23 and 25 are wound around the outer periphery of the cylindrical core, formed by half cores 11 and 13, and serve as the two metal electrodes of the capacitor. The metal sheets 23 and 25 are spaced from each other by two sheets of dielectric material 27 and 29, which are slightly larger in surface area than metal sheets 23 and 25 to prevent the metal sheets from coming into contact with each other and thus short circuiting the capacitor. The inner ends of the sheets, i.e. the ends of the dielectric and metal sheets nearest the core pass between the half cores 11 and 13 and extend into the throughbore formed by recesses 15 and 17. The metal sheet 23 is positioned in contact with lead 21 and is spaced from lead 19 by the dielectric sheet 27. Similarly metal sheet 25 is positioned in contact with lead 19 and is spaced from the lead 21 and from metal sheet 23 by the dielectric sheets 27 and 29. The dielectric sheet 29 is positioned between the metal sheet 25 and half core 11.

The recesses 15 and 17 are made of a size such that when half cores 11 and 13 are pressed together, the leads 19 and 21 together with dielectric sheets 27 and 29 and metal sheets 23 and 25 are constrained by the peripheral wall of the recesses 15 and 17. Thus if the dielectric and metal sheets forming the spaced capacitor electrodes, are wound tightly around the half cores 11 and 13, the convolutions of dielectric and metal sheets will bind the half cores together and thereby retain the capacitor leads 19 and 21 in the axial throughbore of the capacitor.

It will now be appreciated by those skilled in the art that the capacitor of my invention provides a rugged unit which utilizes inexpensive parts and which is inexpensive to manufacture. Further, the positioning of the capacitor leads in the axial throughbore in the capacitor core eliminates the undesirable eccentric lead location present in the uncased capacitors of the known prior art and facilitates the mounting of the capacitor.

While I have illustrated one embodiment of my invention, many modifications are possible and will become readily apparent to those skilled in the art from the foregoing disclosure and, therefore, it is intended to be illustrative only and the scope of the invention is defined in the appended claim.

Having now particularly described my invention what I desire to secure by Letters Patent of the United States and what I claim is:

A solid wound capacitor comprising two metal foil electrodes, a first sheet of dielectric material coextensive with and positioned between said electrodes for spacing said electrodes, a second sheet of dielectric material coextensive with said first sheet and spaced therefrom by one of said electrodes, a solid cylindrical core having an axial throughbore of a given diameter and being formed of two semi-cylindrical sections, both of said sheets and both of said electrodes being positioned between said sections in said throughbore and being tightly wound around the periphery of said core to exert a radial force on said core and to bind together said semi-cylindrical sections, two wire conductors positioned in non-overlapping relation in said throughbore and extending in substantially axial alignment from the opposed ends thereof, one of said conductors being in contact with one only of said electrodes and the other of said conductors being in contact with the other only of said electrodes and being electrically insulated from said one conductor by said first sheet of dielectric material, said diameter of said throughbore being less than the combined thickness of one of said conductors, said dielectric sheets and said electrodes whereby each of said conductors is constrained against axial pull-out from the capacitor by the peripheral wall of said throughbore under said radial force exerted by said sheets and said electrodes wound on said core.

References Cited in the file of this patent

UNITED STATES PATENTS

| | | |
|---|---|---|
| 239,371 | De Forest | Mar. 29, 1881 |
| 1,725,123 | Bailey | Aug. 20, 1929 |
| 1,767,412 | Sprague | June 24, 1930 |
| 2,177,266 | Schupp | Oct. 24, 1939 |

FOREIGN PATENTS

| | | |
|---|---|---|
| 879,569 | Germany | June 15, 1953 |